United States Patent
Weiberle et al.

(10) Patent No.: US 7,831,889 B2
(45) Date of Patent: Nov. 9, 2010

(54) METHOD AND DEVICE FOR ERROR DETECTION FOR A CACHE MEMORY AND CORRESPONDING CACHE MEMORY

(75) Inventors: Reinhard Weiberle, Vaihingen/Enz (DE); Bernd Mueller, Gerlingen (DE); Thomas Kottke, Ehningen (DE)

(73) Assignee: Robert Bosch GmbH, Stuttgart (DE)

( * ) Notice: Subject to any disclaimer, the term of this patent is extended or adjusted under 35 U.S.C. 154(b) by 897 days.

(21) Appl. No.: 10/561,634

(22) PCT Filed: Jun. 18, 2004

(86) PCT No.: PCT/DE2004/001234

§ 371 (c)(1),
(2), (4) Date: Mar. 26, 2007

(87) PCT Pub. No.: WO2004/114135

PCT Pub. Date: Dec. 29, 2004

(65) Prior Publication Data

US 2007/0271485 A1    Nov. 22, 2007

(30) Foreign Application Priority Data

Jun. 18, 2003    (DE) ................. 103 27 549

(51) Int. Cl.
*G11C 29/00* (2006.01)
(52) U.S. Cl. .................. 714/763; 711/108; 711/111

(58) Field of Classification Search ............... 714/763, 714/748; 711/108, 111
See application file for complete search history.

(56) References Cited

U.S. PATENT DOCUMENTS

| | | | |
|---|---|---|---|
| 4,084,236 A | | 4/1978 | Chelberg et al. |
| 4,637,024 A | * | 1/1987 | Dixon et al. ............... 714/819 |
| 5,148,533 A | * | 9/1992 | Joyce et al. ............... 711/144 |
| 5,345,582 A | | 9/1994 | Tsuchiya |
| 5,477,553 A | * | 12/1995 | Kong ........................ 714/805 |
| 5,832,250 A | * | 11/1998 | Whittaker .................. 711/144 |
| 6,101,578 A | * | 8/2000 | Patwardhan et al. ........ 711/125 |
| 6,772,383 B1 | * | 8/2004 | Quach et al. ............... 714/746 |
| 6,971,041 B2 | * | 11/2005 | DeSota et al. ................ 714/6 |
| 7,337,352 B2 | * | 2/2008 | DeSota ......................... 714/6 |
| 7,376,877 B2 | * | 5/2008 | Quach et al. ................. 714/746 |

FOREIGN PATENT DOCUMENTS

WO    92/19046    10/1992

* cited by examiner

*Primary Examiner*—Sam Rizk
(74) *Attorney, Agent, or Firm*—Kenyon & Kenyon LLP

(57) ABSTRACT

A method for error detection in a cache memory for storing data, the access to the data stored in the cache memory taking place by addresses assigned to them, wherein for the addresses assigned to the stored data, at least one first test signature made up of at least one first signature bit is generated and also stored in the cache memory.

12 Claims, 2 Drawing Sheets

METHOD AND DEVICE FOR ERROR DETECTION FOR A CACHE MEMORY AND CORRESPONDING CACHE MEMORY

FIELD OF THE INVENTION

The present invention relates to a method and a device for error detection for a cache memory as well as a corresponding cache memory.

BACKGROUND INFORMATION

The clock frequency of today's processors is typically clearly higher than the frequency at which one is able to access an, in particular, external memory. Cache memories are used in order to compensate for this time difference. By the cooperation of such a rapid buffer memory with a corresponding main memory, the access times are then able to be clearly reduced. In error-tolerant computers, it is customary these days that, in the cache memory, the data are protected via an error-detecting or error-correcting code (ECC, error code correction). But if errors occur in the logic of the cache memory, this data protecting is no longer sufficient. It becomes ever more susceptible, especially to transient errors, because of structures that are becoming ever smaller, particularly the logic of the cache memory.

SUMMARY OF THE INVENTION

The present invention shows a method and a device for error detection for a cache memory as well as a corresponding cache memory for storing data, the access to the data stored in the cache memory taking place by addresses assigned to them and, in an advantageous manner, at least one first test signature, made up of at least one first signature bit, being generated for the addresses assigned to the stored data, and being also stored in the cache memory.

Therefore, the object of the present invention, besides protecting the data, is also to exclude additional error possibilities, and thus to represent a more secure cache memory than the related art is able to achieve.

Thereby it is possible, besides the known protecting of the cache data, also to protect the cache logic by error detection and/or error correction, so that a cache memory is able to be implemented in which, during a reading access, all errors are able to be detected, since checking the first test signature is able to be carried out successfully at each reading access to the cache memory.

Expediently, the at least one stored first signature bit of the first test signature is compared to a second signature bit of a second test signature which is formed from an address put in the cache memory, or is already passed along with the address (for instance, by the computing unit included in the CPU).

In order also to detect errors in the valid bit of the cache memory, this is stored at least twice. Expediently, the valid bit is stored m-fold and checked using an n-of-m test, n and m being natural numbers, m being greater than 2 and n being greater than m/2. Thereby at least single error tolerance may be achieved.

In this context, the valid bit may also be stored k-fold in the form of a 1 of k code, k corresponding to a natural number, whereby, advantageously, multiple errors may also be detected, since, in that case, only 1 of $2^k$ bit combinations corresponding to the 1 of k code is valid.

The use of the present invention is especially advantageous in the case of an instruction cache, that is, in a cache memory in which, as data, only instructions, or rather commands, are stored. Since in this, almost exclusively reading errors are to be taken into consideration, the method according to the present invention and the device according to the present invention, as well as a corresponding cache memory, may then almost completely cover the protecting and the error correction.

Advantageously, sets or groups of data are stored together with the corresponding assigned first test signatures, under a first line index in the cache memory, this first line index being retrieved from the cache memory by line coding, and being compared for agreement to a stored second line index.

As a function of the respective comparison of the test signatures or the valid bit or the line index retrieved by line coding, an error signal is correspondingly generated. On the one hand, this may be generated generally, i.e. differently when an error is detected and when agreement is detected, or such an error signal is generated only when an error signal is detected.

Expediently, this error signal is then treated as a cache miss signal when an error is detected, with the result that such erroneous data or addresses are not used, but are corrected or replaced.

Advantageously, upon detection of an error, if the data or instructions are again loaded from the backup memory into the cache memory, a highly disposable, error-tolerant system is able to be achieved thereby, which, in addition, stands out by its cost-effective error detection mechanisms.

DETAILED DESCRIPTION

Figure 1:
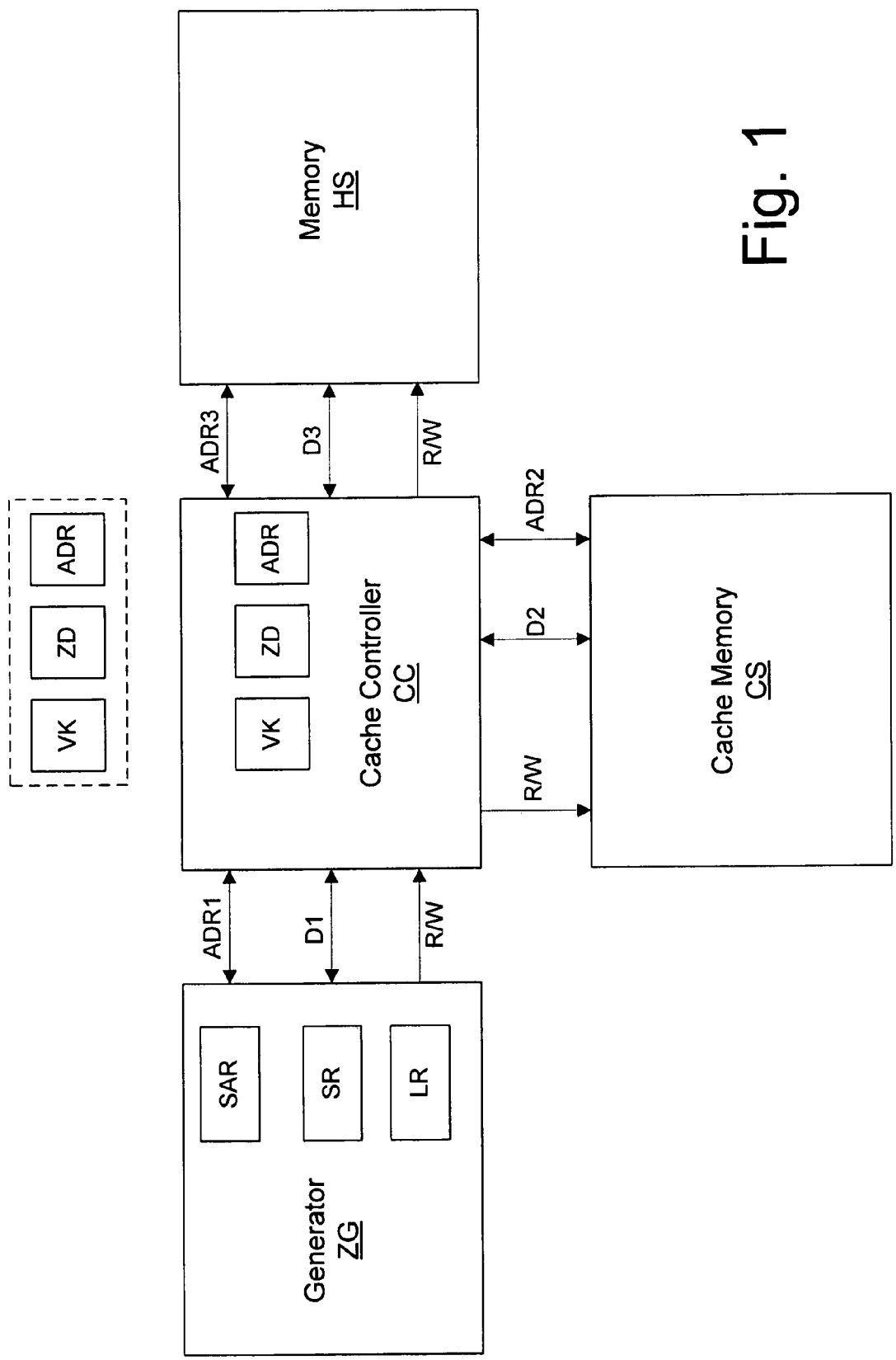
FIG. 1 shows an example of a cache memory system according to the present invention.

FIG. 1 shows a foreground memory or cache memory CS and a main memory or backup memory HS. An access generator ZG is also illustrated, which may correspond, for example, to a central processing unit. Between the unit that calls for or changes data, that is, access generator ZG and backup memory HS, a controller, the so-called cache controller CC is connected, which stores the data in cache memory CS and thus keeps them in storage for further access. The access generator and the cache controller are connected to each other via an address line ADR1, a data line D1 and a write/read line R/W. Similarly, cache controller CC is connected to cache memory CS via an address line ADR2, a data line D2 as well as a write/read line R/W. There are also such connections between cache controller CC and main memory HS using address line ADR3, data line D3 and write/read line R/W.

If only one transmission direction is required, e.g. for exclusive reading of commands from the working memory in the case of an instruction cache, that is, a cache memory in which only instructions are stored, the R/W lines, i.e. the write/read lines between access generator ZG and cache controller CC as well as between cache controller CC and backup memory HS may be omitted. It is true that cache controller CC always has to be able to write and read on the foreground memory or cache memory CS, so that the R/W line remains intact between cache controller CC and cache memory CS even in the case of an instruction cache.

Access instructions consequently are made up of an address and, in the case of write accesses, the new data, as well as, in the case of a not pure instruction cache, the type of access, that is, read or write transmitted via the R/W read-write line. Access generator ZG sends such requests or commands to cache controller CC which processes these, namely by suitable requests to cache memory CS and/or backup memory HS. In the case of the access generator, if a central processing unit CPU is involved, or if it is included in the CPU, the access address is generally already inscribed in a memory address register SAR, and the data to be written in a write register SR, whereas read data are generally taken up in a read register LR.

In order to carry out the comparisons according to the present invention that will still be explained below, a comparator component VK is provided. To retrieve a line index, a line decoder ZD is provided, and to retrieve the address information for the comparison according to the present invention, an address block ADR is provided. Depending on the application, a different number of comparators may be provided in comparator component VK. Similarly, the application of blocks VK, ZD and ADR is not fixed and may vary according to the application, and in particular, these blocks may also be advantageously localized in any combination externally to cache controller CC, and be connected to it.

Figure 2:
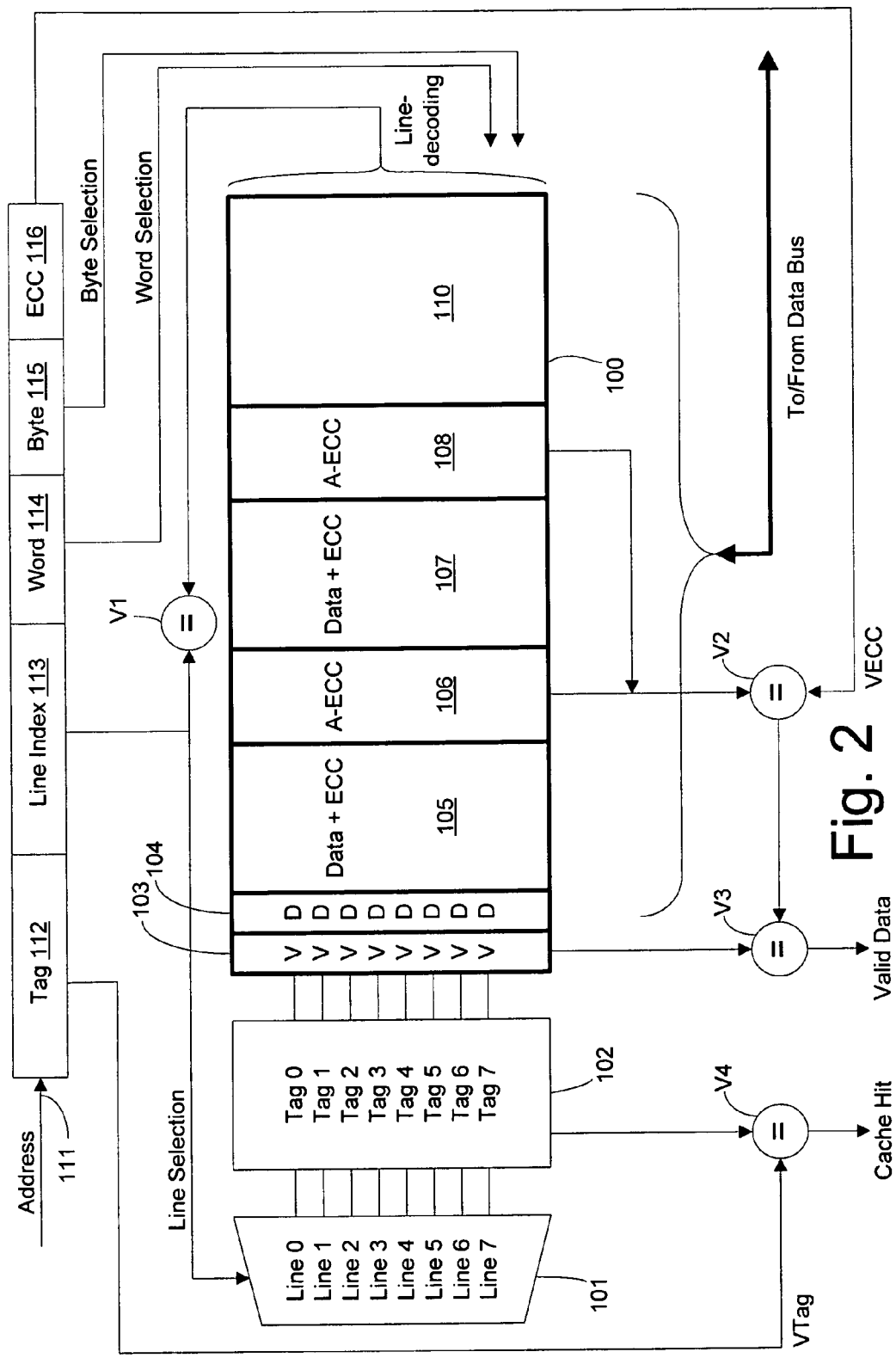
FIG. 2 shows symbolically the cache memory and the comparisons for error detection undertaken according to the present invention.

Now, FIG. 2 shows methods according to the present invention for error detection in the cache memory, the basic assumption for installing this cache memory being represented by the protection of the addresses using an error detection code or an error correction code, that is, a signature. In the simplest case, this signature may be made up only of one signature bit, such as a parity bit. On the other hand, the protection may also be implemented by more complex ED (error detection) codes such as a Berger code or a Bose-Lin code, etc, or even by a more complex ECC (error check and correction) code, such as a Hamming code, etc, in order to make possible a secure error detection by an appropriate bit number. But as code generator one may also use, for instance, a generator table (hardwired or in software), in order to assign a desired code pattern of any desired length to certain input patterns of the bits within the scope of the address.

In FIG. 2, such a cache memory 100 is shown symbolically. In it, regions 103, 104, 105, 106, 107, 108 and 110 are distinguished. In regions 105 and 107, and also in 110, etc, the respective data are stored in the cache memory, supplemented by an ECC signature, in order to detect errors in the memory stored in the cache. The address signature A-ECC is stored in this case in blocks 106, 108 as well as 110, and assigned to the corresponding data according to the address. In the example, such an address 111 is made up of a block 112, which includes a tag or an identification character that indicates to which initial address the respective data block really belongs, since, as shown in FIG. 2, several regions of the backup memory, see data 105 and 107, are shown in one line or in one set. In this example, according to block 102, one set or one line contains 8 tags from tag 0 to tag 7. Block 113 contains the line index by which the line selection, here of line 0 to line 7, takes place according to block 101. In addition, and optional, are block 114 and block 115 which are used for word selection or byte selection within one line and one tag. Fields 114 and 115 strongly depend on the word length used of the individual data fields, and are not essential. Field 116 then contains the test signature of address 111, that is, of fields 112 to 115.

Now, there are two basic types of errors in the cache memory: On the one hand there are errors in the data stored in the cache memory, and on the other hand there are data in the cache logic, especially in the cache controller. Data that are in a cache memory are still stored in another place in the main memory or the backup memory, or even in a nonvolatile memory. If one has made certain that the data in both memories are consistent, that is, in the cache memory and the backup memory, errors in the data in the cache memory, as a result, only have to be detected, but not corrected. This detection may take place by protection of the data using an ED code or an ECC code, as shown in FIG. 2. If the data are not consistent, e.g. in the case of a data cache, an ECC code may be used, as in FIG. 2.

Upon detection of errors in the cache logic, in the case of a reading access to a data word in the cache memory, in the case of a directly assigned cache, first using line selection, that is, the line index, the appropriate cache memory line is selected Subsequently, it is checked in this line whether tag field 112 in this line is correct according to block 102, and compared in V4, in which the tag field is compared to the tag from block 102 via tag field comparison VTag according to V4 and whether in the case of agreement a cache hit results. If this is the case, that is, in the case of a cache hit, then in the case of a valid bit V the corresponding word is read out from the line. Errors in this region of the cache logic may appear in the line selection, in tag memory 102 and in the comparator for the tag field. These errors have the effect that access is made to the wrong line or to the wrong data in the cache memory.

In order to detect errors in the valid bit, this must at least be duplicated, and thus it is, for example, stored in duplicate in field 103 or in another field. An n-of-m code, that is, an n-of-m test is also advantageous, so that in response to similar breakover of several bits by a coupling error a detection can still take place, n and m being natural numbers, and m being >2, and n>m/2. Whereby at least one single error tolerance is able to be ensured.

In this context, the valid bit may also be stored k-fold in the form of 1 of k codes, k corresponding to a natural number, whereby advantageously multiple errors in bit error are able to be detected, since in this context only one bit combination of $2^k$ bit combinations is valid corresponding to the 1 of k code, and consequently, by comparison, any number of deviations from the valid bit combination are detectable.

In this context, the valid bit or valid-invalid bit indicates whether there are any valid data at all present in the cache memory cell, since both the tag field and the data block always contain a bit pattern. However, initially the data do not correspond to the value present at the address in the backup memory. Here, too, individual flags may be present for parts of the block. In section 104 there is provided a so-called modified flag or dirty flag or bit pattern D, which indicates whether the content of the data block is still in agreement with the backup memory, or whether it was read and subsequently modified, but operation has not yet been restored.

Thus, the test signatures from sections 106 and 108, etc, that is, A-ECC having the corresponding test pattern, that is, the test signature corresponding to block 116 according to arrow V-ECC and V2 are now compared, and the result is then checked according to V3 using the correct checked valid bit, in order then to obtain the statement "valid data" if there is agreement.

The line selection may be regarded, according to the present invention, as line decoder or line decoding. In this connection, errors are detected by back-decoding of the selected line and comparison of the address retrieved from it to the selected line index, as is shown via comparison V1.

The comparators additionally provided in a usual cache memory, here symbolically designated as V1 to V4, may be collectively accommodated in comparison component VK shown in FIG. 1. The formation of the respective address ECC takes place in block ADR according to FIG. 1, and the line decoding takes place in block ZD The formation of the respective Address ECC may also take place in the CPU of the computer unit, that is, especially in ZG.

During the checking of the tag field and of possibly occurring errors, the comparison of a special specific embodiment occurs bitwise. Then, in the error case, one may assume a single error. This single error is then detected by the error detection code of the address A-ECC, which is stored with the corresponding data. Consequently, all errors, even transient errors, may be detected in the cache memory. This applies for the single error case described, even if only one test bit, especially a parity bit, is used for the address protection. Errors in the word selection are also detected by comparison of the co-stored test signature of the address.

The method according to the present invention, the device and the corresponding cache memory may also be used so as to select certain errors in writing on a cache memory. If an addressing error occurs during writing on the cache memory by an error of cache controller CC, the erroneous line address, that is, the erroneous line index, can also be detected by the line decoder. If the tag field is corrupted, the error is detected by the error detection code stored with the data, when the data are read out again. Similarly, errors in the address coding bits are also detected during reading out.

In the case of a pure instruction cache, that is, a cache memory, in which only commands are stored as data, reading errors may be taken into consideration almost exclusively, so that, in that case, an error is detected at once by the error detection during reading out.

Upon detection of an error, if the data or instructions are again loaded from the backup memory into the cache memory, a highly disposable, error-tolerant system is able to be achieved thereby, which, in addition, stands out by its cost-effective error detection mechanisms. In this context, such a repeated loading from the backup memory may be made dependent on two factors, namely, first of all, on the error or the respective error detection, and secondly, on the data section or instructions section in which the error occurred. That means, in the simplest case, when an error occurs, the data (that is, data and/or instructions) are loaded from the backup memory into the cache memory in completely renewed fashion.

As a function of certain errors corresponding to the aforementioned error detection mechanisms, only parts of the last loaded database may also be loaded in renewed fashion (e.g. the more serious the error, the greater the data proportion). As a function of these two factors, any number of progressions and relationships are then possible.

With that, corresponding to the methods and devices as well as cache memories according to the present invention, a secure and highly disposable cache memory may be described which is protected in a cost-effective way both against errors in the data and against errors in the cache logic.

What is claimed is:

1. A method for performing an error detection in a cache memory for storing data, the access to the data stored in the cache memory taking place by addresses assigned thereto, comprising:

for the addresses assigned to the stored data, generating and storing in the cache memory at least one first test signature made up of at least one first signature bit;

storing a valid-invalid bit at least in duplicate in the cache memory;

to a group of data and appertaining first test signatures, assigning in each case a first line index in the cache memory;

comparing the first line index to a second line index applied at the cache memory; and retrieving the first line index from the cache memory by line decoding.

2. The method as recited in claim 1, further comprising:
checking the first test signature for each read access to the cache memory.

3. The method as recited in claim 2, further comprising:
detecting at least one error as a function of a respective comparison result; and
if the at least one error is detected, loading the data into the cache memory in renewed fashion.

4. The method as recited in claim 1, further comprising:
comparing the at least one stored first signature bit of the first test signature to a second signature bit of a second test signature that is formed from an address applied at the cache memory.

5. The method as recited in claim 1, further comprising:
comparing the at least one stored first signature bit of the first test signature to a second signature bit of a second test signature that is transferred together with an address applied at the cache memory.

6. The method as recited in claim 1, wherein the valid-invalid bit is stored m-fold and is checked using an n of m test, m, n being natural numbers and m being $>2$ and $m>n>m/2$.

7. The method as recited in claim 1, wherein the valid-invalid bit is stored k-fold as a bit combination in the form of a 1 of k code, by comparison 1 bit combination of $2^k$ bit combinations being detected as valid, k corresponding to a natural number.

8. The method as recited in claim 1, wherein the data include instructions.

9. The method as recited in claim 1, further comprising:
generating an error signal as a function of a comparison result.

10. The method as recited in claim 9, wherein the error signal is treated as a cache miss signal.

11. A device for performing an error detection in a cache memory for storing data, the access to the data stored in the cache memory taking place by addresses assigned thereto, comprising:

an arrangement, regarding the addresses assigned to the stored data, for generating and storing in the cache memory at least one first test signature made up of at least one first signature bit, the arrangement further configured to perform: generating and storing in the cache memory a valid-invalid bit at least in duplicate; to a group of data and appertaining first test signatures, assigning in each case a first line index in the cache memory; comparing the first line index to a second line index applied at the cache memory; and retrieving the first line index from the cache memory by line decoding.

12. The device as recited in claim 11, wherein:
the device is part of the cache memory.

* * * * *